July 24, 1951  A. J. NEJEZCHLEB  2,561,632
SHIFTING LEVER STABILIZER
Filed Nov. 10, 1950  2 Sheets-Sheet 1

Inventor
A. J. Nejezchleb
By Arthur H. Sturges
Attorney

July 24, 1951      A. J. NEJEZCHLEB      2,561,632
SHIFTING LEVER STABILIZER
Filed Nov. 10, 1950      2 Sheets-Sheet 2
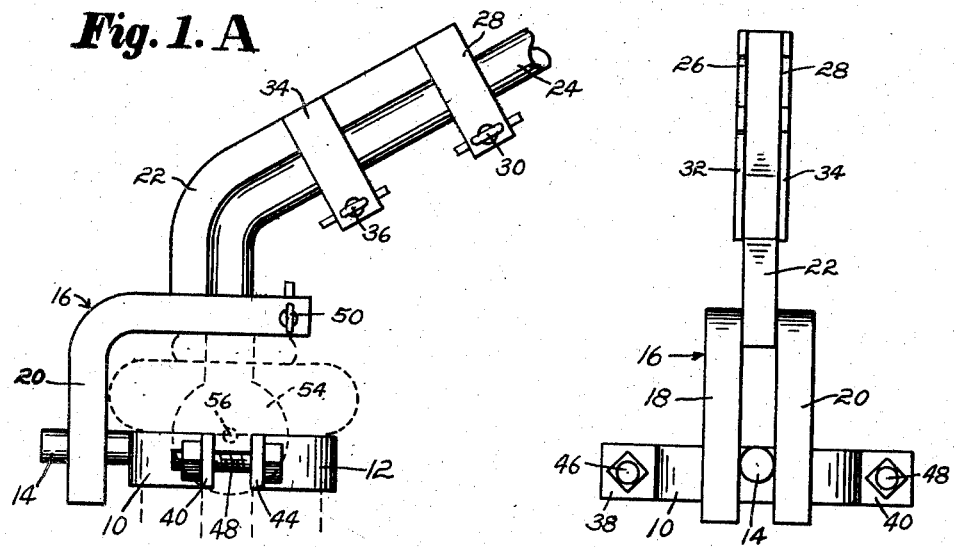
*Fig. 1. A*
*Fig. 2. A*
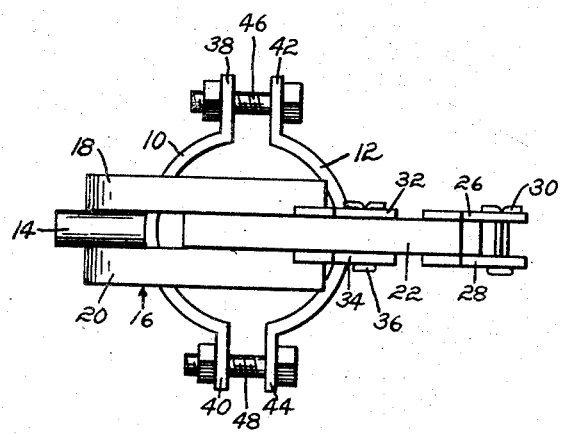
*Fig. 3. A*
Inventor
A. J. Nejezchleb
By Arthur H. Sturges
Attorney Patented July 24, 1951

2,561,632

UNITED STATES PATENT OFFICE 2,561,632

SHIFTING LEVER STABILIZER

Albert J. Nejezchleb, Fairfield, Nebr.

Application November 10, 1950, Serial No. 194,989

6 Claims. (Cl. 74—473)

This invention relates to locking or stabilizing attachments for farm machinery, and in particular a bracket mounted on the transmission of a tractor and positioned around the gear shift lever to prevent wobbling of the gear shift lever caused by vibration of the tractor.

The purpose of this invention is to eliminate excessive wear in the sockets of gear shift levers of tractors, particularly of the type used on farms where operation of the tractor over uneven surfaces causes the gear shift lever to rock back and forth whereby the overhung load of the upper end of the lever, which increases the leverage in the mounting socket, causes excessive wear, particularly in the outer end of the socket.

In the conventional type of gear shift lever mounting a ball on the lower end of the lever is freely held in a socket in the upper end of a neck on the transmission housing and as the center of the ball is comparatively close to the outer end of the socket the weight of the lever is taken by the short remaining surface in the end of the socket. This not only causes the sockets to wear rapidly but makes shifting of the gears difficult. This excessive freedom of movement of the gear shift lever prevents immediate shifting and consequently consumes time when time is an essential factor and may result in damage to the parts. With this thought in mind, this invention contemplates a clamp positioned around the neck of the transmission housing and a pair of guides clamped to the gear shift lever and positioned to coact with the clamp on the neck of the housing to provide means for holding and stabilizing the lever beyond the end of the transmission housing neck.

The object of this invention is, therefore, to provide a stabilizing device for the gear shift lever of a tractor that may readily be attached to the transmission housing and lever to prevent vibration and consequently wear in the gear shift mechanism.

Another object of the invention is to provide an attachment for the gear shift lever of a tractor transmission which facilitates shifting the gears.

Another object of the invention is to provide stabilizing means in the gear shift lever of a tractor transmission whereby the speed of shifting the gears is increased.

A further object of the invention is to provide an attachment for stabilizing gear shift levers of tractor transmissions that may readily be attached by an operator of a tractor.

A still further object is to provide a stabilizing device for tractor transmission gear shift levers which is of a simple and economical construction.

With these and other objects and advantages in view, the invention embodies a clamp formed with substantially semi-circular members with a pin extended from one of said members and a yoke having spaced arms positioned to straddle the said pin and means for attaching the arms to a gear shift lever extended from a transmission housing neck upon which the said clamp is positioned.

Other features and advantages of the invention will appear from the following description taken in connection with the drawings, wherein:

Figure 1—A is a side elevational view illustrating the preferred form of the attachment with the upper part positioned on the lower end of a gear shift lever and with the lower part positioned on the neck of a transmission housing, the said neck being in dotted lines.

Figure 2—A is an end elevational view of the attachment shown in Figure 1—A.

Figure 3—A is a plan view of the attachment shown in Figure 1—A.

Figure 1:
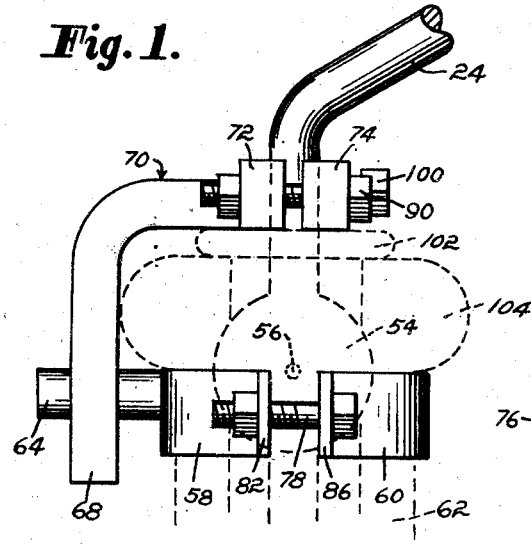
Figure 1 is a side elevational view similar to that shown in Figure 1—A illustrating a modification wherein the yoke is attached to the lower end of the gear shift lever by a clamp.
Figure 2:
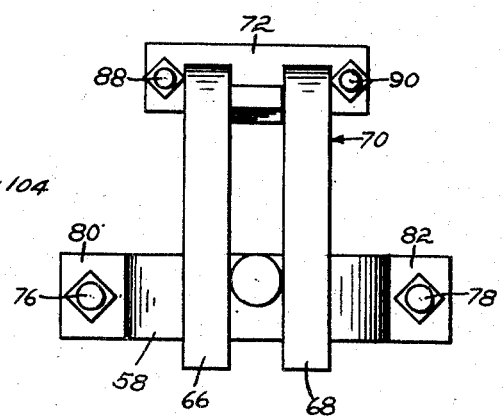
Figure 2 is an end elevational view of the attachment shown in Figure 1.

Referring now to the drawings wherein like reference characters denote corresponding parts, the gear shift lever stabilizing attachment of this invention includes a clamp formed with substantially semi-circular sections 10 and 12 with a pin 14 extended from the section 10, a yoke 16 having parallel fingers 18 and 20, and a tongue 22 extended upwardly from the yoke and clamped to a transmission lever 24 with spaced clamps formed with side plates 26 and 28, held by a cotter pin 30, and side plates 32 and 34 held by a cotter pin 36.

Figure 3:
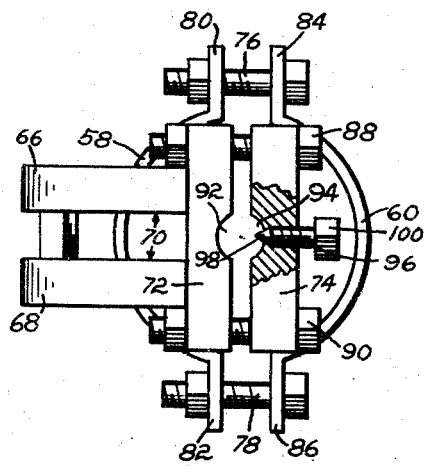
Figure 3 is a plan view of the attachment shown in Figure 1 with part broken away and shown in section, illustrating a set screw for positioning a section of the clamp on the gear shift lever.
Figure 4:
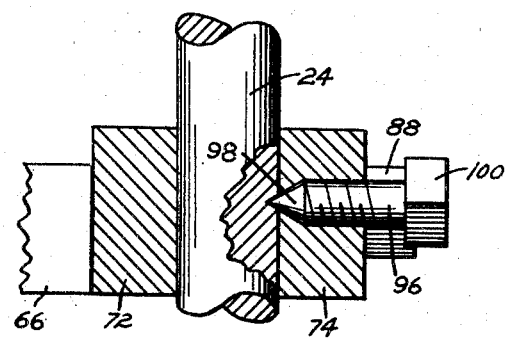
Figure 4 is a detail on an enlarged scale showing a section to the clamp illustrated in Figure 1 and also showing the set screw.

The clamp section 10 which carries the pin 14 is provided with flanges 38 and 40 and the section 12 is provided with similar flanges 42 and 44, and the flanges are secured together by bolts 46 and 48 as shown in Figure 3—A.

The tongue 22 which extends from a point between the fingers 18 and 20 is secured to the fingers, preferably by welding, and the ends of the fingers which extend beyond the gear shift lever 24 are held by a pin cotter 50.

By this means a ball 54 on the lower end of the lever 24 is stabilized and substantially all play in the connection is eliminated, or taken up by the upper clamp or bracket and the lower clamp which are freely connected by the fingers and pin 14 which extends between the fingers.

In the conventional gear shift mounting a pin 56 extends through the upper part of the neck of the transmission housing and engages the ball 54, for the purpose of eliminating wear or looseness in the joint, however, these pins wear rapidly and the usefulness of the pins is limited to a comparatively short time.

In the design illustrated in Figures 1 to 4, a clamp formed with sections 58 and 60 is positioned on a transmission housing neck 62, which is shown in dotted lines, and a pin 64, similar to the pin 14, which extends from the section 58, is positioned between parallel fingers 66 and 68 of a yoke 70 which is secured to a gear shift lever 24 by a clamp formed with sections 72 and 74.

The sections 58 and 60 of the clamp on the transmission housing neck are clamped to the neck by bolts 76 and 78 which extend through flanges 80 and 82 on the section 58 and 84 and 86 on the section 60.

The upper clamp, which is formed with the sections 72 and 74, straddles the gear shift lever and these sections are clamped around the lever by bolts 88 and 90. The clamp section 72 is provided with an arcuate recess 92 that is positioned to receive one side of the lever and the section 74 is provided with a similar arcuate recess 94 that receives the opposite side of the lever.

The bolts 88 and 90 are positioned in extended ends of the clamp sections 72 and 74, as shown in Figure 3.

The clamp section 74 is also provided with a set screw 96 which is formed with a point 98 and the point is forced into the lever 24 as the screw is turned by a wrench or the like positioned on the head 100.

The transmission neck of the design illustrated in Figures 1 to 4 is similar to that shown in Figure 1 wherein a ball 54 is held in the socket by a pin 56, the ball, pin and neck of the transmission housing being indicated by the dotted lines, as shown in Figure 1.

With the parts arranged in this manner and with the upper end of the yoke resting upon a restricted portion 102 of a rubber cap 104 on the end of the neck, the gear shift lever is free to actuate the gears and at the same time it is retained in position so that wobbling thereof is substantially eliminated.

With the movement of the lever restricted in this manner the upper end is always in position and the operator may shift gears with greater speed. Restricting the movement of the lever in this manner also reduces wear on the operating parts to a minimum.

From the foregoing description it is thought to be obvious that a gear shift lever stabilizer constructed in accordance with this invention is particularly well adapted for use by reason of the convenience and facility with which it may be assembled and operated, and it will also be obvious that the invention is susceptible of some change and modification without departing from the principles and spirit thereof, and for this reason it is not to be understood that the invention is limited to the precise arrangement and formation of the several parts herein shown, except as claimed.

Having thus fully described the invention, what I claim is new and desire to secure by Letters Patent is:

1. A gear shift lever attachment comprising a clamp having a pin extended from one side thereof, and an L-shape yoke having a vertically disposed leg and a horizontally disposed arm, said horizontally disposed arm having means thereon for clamping the yoke to a gear shift lever and said vertically disposed leg formed with parallel downwardly extended fingers positioned to straddle the pin extended from the clamp, with the clamp positioned on the neck of a transmission housing from which the gear shift lever extends.

2. A gear shift lever attachment, comprising a transmission housing, having a neck extended therefrom, a gear shift lever extended from the neck of the housing, a clamp including flanged substantially semi-circular sections secured by bolts on the neck of the said transmission housing, one of said sections having a pin extended therefrom, and a yoke clamped to the said gear shift lever and having fingers extended therefrom with the fingers positioned to straddle the pin extended from the clamp.

3. A gear shift lever attachment comprising a transmission housing having a neck, a gear shift lever extended from the neck of the transmission housing, a pair of flanged substantially semi-circular bands positioned on the neck of the transmission housing, bolts extended through the flanges of the bands for clamping the bands to the neck of the housing, one of said bands having a pin extended therefrom, an L-shape bracket having vertically disposed parallel fingers positioned to straddle the said pin extended from one of the said bands, and means clamping the said bracket to the said gear shift lever.

4. A gear shift lever attachment comprising a transmission housing having a neck, a gear shift lever extended from the neck of the transmission housing, a pair of flanged substantially semi-circular bands positioned on the neck of the transmission housing, bolts extended through the flanges of the bands for clamping the bands to the neck of the housing, one of said bands having a pin extended therefrom, an L-shape bracket having vertically disposed parallel fingers positioned to straddle the said pin extended from one of the said bands, and a tongue having pairs of clamping plates thereon extended upwardly from the bracket and positioned on the said gear shift lever.

5. A gear shift lever attachment comprising a transmission housing having a neck, a gear shift lever extended from the neck of the transmission housing, a pair of flanged substantially semi-circular bands positioned on the neck of the transmission housing, bolts extended through the flanges of the bands for clamping the bands to the neck of the housing, one of said bands having a pin extended therefrom, an L-shape bracket having vertically disposed parallel fingers positioned to straddle the said pin extended from one of the said bands, said bracket having spaced parallel bars positioned to straddle the said gear shift lever, and bolts extended through the ends of the bands for clamping the bars on the said gear shift lever, one of said bars carrying the said parallel fingers.

6. A gear shift lever attachment comprising a transmission housing having a neck, a gear shift lever extended from the neck of the transmission housing, a pair of flanged substantially semicircular bands positioned on the neck of the transmission housing, bolts extended through the flanges of the bands for clamping the bands to the neck of the housing, one of said bands having a pin extended therefrom, an L-shape bracket having vertically disposed parallel fingers positioned to straddle the said pin extended from one of the said bands, said bracket having spaced parallel bars positioned to straddle the said gear shift lever, bolts extended through the ends of the bands for clamping the bars on the said gear shift lever, one of said bars carrying the said parallel fingers, and a set screw in one of said bars for positioning the said bracket on the lever.

ALBERT J. NEJEZCHLEB.

No references cited.